United States Patent [19]

Roueche

[11] 4,269,976
[45] May 26, 1981

[54] PIGMENT OF SODIUM SALT OF BIS-METHINE-BARBITURIC ACID

[75] Inventor: Armand Rouèche, Bottmingen, Switzerland

[73] Assignee: Ciba-Geigy Corporation, Ardsley, N.Y.

[21] Appl. No.: 69,411

[22] Filed: Aug. 24, 1979

[30] Foreign Application Priority Data

Sep. 5, 1978 [CH] Switzerland .......................... 9335/78

[51] Int. Cl.³ .................... C09B 23/00; C09B 55/00
[52] U.S. Cl. ................................ 542/445; 260/37 R; 260/37 N; 260/37 EP; 260/38; 260/39 R; 260/40 R; 260/42.21; 542/431
[58] Field of Search ............................ 542/445, 431

[56] References Cited

FOREIGN PATENT DOCUMENTS 1581898 9/1969 France ........................................ 542/445
1265485 3/1972 United Kingdom ....................... 542/445

*Primary Examiner*—William F. Hamrock
*Attorney, Agent, or Firm*—Luther A. R. Hall; Harry Falber; Joseph F. DiPrima

[57] ABSTRACT

The invention relates to the pigment of the formula

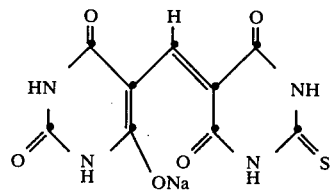

It colors plastic materials and lacquers in greenish-yellow shades of good lightfastness.

1 Claim, No Drawings

PIGMENT OF SODIUM SALT OF BIS-METHINE-BARBITURIC ACID

The present invention relates to the sodium salt of the bismethine-barbituric acid of the formula

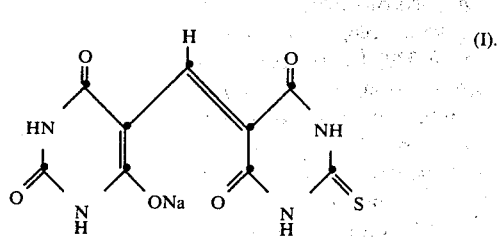

This compound can also be in the form of an enol

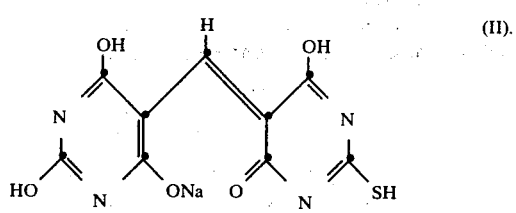

The pigment is obtained preferably by condensation of the aldehyde of the formula

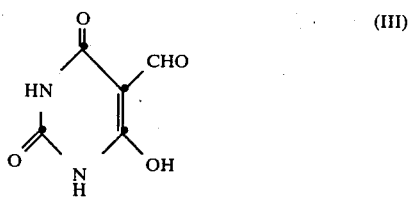

with thiobarbituric acid in the molar ratio 1:1 and subsequent salt formation by conventional methods.

The compound of the formula (I) is also obtained in good yield by condensing the metal salt of a compound of the formula

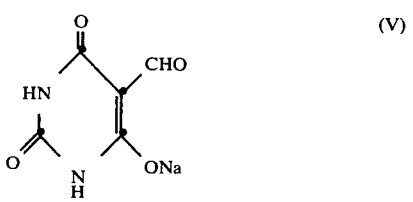

with thiobarbituric acid.

The barbituric acid aldehyde is obtained by known methods. The condensation of the barbituric acid aldehyde and of its sodium salt with thiobarbituric acid is carried out by heating in a solvent at 20°–180° C., preferably at 70°–150° C., resulting in many cases in an increase in the granular size of the pigment, which in turn has an advantageous influence on the fastness to light and migration of the pigment.

Particularly suitable solvents which can be employed in the above process are: water; ketones, such as acetone, methyl ethyl ketone or cyclohexanone; alcohols, such as methanol, ethanol, isopropanol, n-butanol, ethylene glycol monomethyl or monoethyl ether; benzenes, such as toluene, xylenes, chlorobenzene, dichlorobenzenes or nitrobenzene; and also pyridine, picoline, quinoline, formamide, dimethyl formamide, N-methylpyrrolidone, dimethyl sulfoxide, formic acid or acetic acid. The reaction can also be carried out in water in the presence of organic solvents. Instead of using pure solvents, it is also possible to use mixtures of different organic solvents with or without water.

The reaction proceeds preferably at elevated temperature in the course of 30 minutes to 10 hours, preferably 2 to 4 hous. The sparingly soluble product is normally precipitated from the solution and can be isolated by filtration, washing and drying. To hasten the reaction, it is furthermore possible to use catalytic amounts of piperidine.

The pigment of the formula (I) can be used for colouring organic material of high molecular weight, for example cellulose ethers and esters, such as cellulose acetate, cellulose propionate, cellulose acetobutyrate, nitrocellulose, and also polyolefins, such as polyethylene, polypropylene, substituted polyolefins, such as polyvinyl chloride, polyvinyl acetate, copolymers of vinyl chloride and vinyl acetate, polystyrene, polyacrylonitrile and polyacrylates, as well as aminoplasts, such as urea-formaldehyde and melamine-formaldehyde resins, and epoxy resins, alkyd resins, phenolic plastics and polycarbonates.

A particularly interesting utility is the colouring of lacquers, for example those based on alkyd-melamine-formaldehyde resins and alkyd-urea-formaldehyde resins, as well as on thermoplastic and thermohardening acrylic resins. The pigment of the formula (I) is also of interest for use in printing inks.

The pigment of the formula (I) has good colour strength, dispersibility and thermostability, and the colourations obtained therewith are distinguished by good fastness to migration, light and atmospheric influences.

The invention is illustrated by the following Examples, in which the parts and percentages are by weight, unless otherwise stated.

EXAMPLE 1

42.8 parts of the monosodium salt of 5-formylbarbituric acid (with 2 moles of water of crystallisation) are suspended in 280 parts of dimethyl formamide. A suspension of 28.8 parts of thiobarbituric acid in 300 parts of glacial acetic acid are then added at room temperature to the above suspension in the course of 2 minutes. Then 8 parts of piperidine are added. The suspension is stirred initially for 3 hours at 120° C., then for a further 3 hours at 145° C., whereupon the pigment gradually begins to form. The resulting pigment suspension is cooled to 70° C. and filtered by suction. The residue is washed with 70 parts of cold dimethyl formamide, then with 300 parts of cold water and dried in vacuo at 90° C., affording 39.5 parts of the pigment of the formula

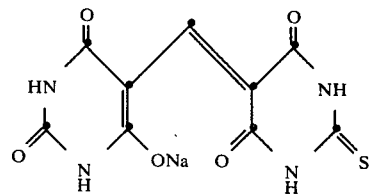

in the form of a yellow powder.

Analysis: (with 1 mole of water of crystallisation): calculated: C 33.5; H 2.17; N 17.3; S 9.9; Na 7.1%; found: C 33.9; H 2.2; N 17.4; S 9.3; Na 7.0%.

When rolled into polyvinyl chloride, this pigment gives reddish-yellow colourations which are fast to migration and light.

EXAMPLE 2

42.8 parts of the monosodium salt of 5-formylbarbituric acid (with 2 moles of water of crystallisation) and 28.8 parts of thiobarbituric acid are suspended at room temperature in 390 parts of o-dichlorobenzene, 150 parts of glacial acetic acid and 0.25 part of pyridine. The suspension is stirred for 5 hours at 114° C., then cooled to room temperature and the yellow suspension is filtered by suction. The residue is washed with 500 parts of petroleum ether and dried in vacuo at 90° C., affording 64 parts (92% of theory) of a yellow pigment of the same formula as in Example 1 and having the same good pigment properties.

EXAMPLE 3

67 g of polyvinyl chloride powder (suspension polymer), 33 g of dioctyl phthalate, 2 g of dibutyl tin dilaurate, 0.3 g of a phosphate stabiliser and 0.7 g of the pigment of Example 1 are mixed and the mixture is processed for 15 minutes on mixing rolls at 160° C. A sheet having a thickness of 0.4 mm is produced on a calender. The sheet is coloured in a yellow shade which is heat-resistant and fast to migration.

EXAMPLE 4

0.2 g of the pigment obtained in Example 1, 1 g of titanium dioxide (rutile) and 100 g LD polyethylene granules are mixed in a drum and the mixture is then processed on mixer rolls at 130° C. The plastic mass is then pressed hot to sheets or moulded in an extruder. The sheets have a pleasing yellow shade of good lightfastness.

EXAMPLE 5

0.1 g of the pigment obtained in Example 1, 0.5 g of titanium dioxide (rutile) and 1000 of polypropylene granules are mixed in a drum and the mixture is subsequently processed on mixer rolls until a homogeneously coloured mixture is obtained. The plastic mass is pressed to sheets of 1 mm thickness. The sheets are coloured in a pleasing yellow shade of good lightfastness. EXAMPLE 6

100 g of a formaldehyde-urea resin powder suitable for moulding materials, 10 g of lithopone and 1 g of the pigment obtained in Example 1 are ground for 16 hours in a ball mill. The composition is then moulded at 140° C. in moulds. The yellow samples obtained have good lightfastness and heat-resistance.

EXAMPLE 7

(Alkyd-melamine stoving lacquer)

60 parts of a 60% solution of a non-drying alkyd resin in xylene (sold under the registered trademark "Beckosol 27-320" by Reichold-Albert-Chemie), 36 parts of a 50% solution of a melamine-formaldehyde resin in an alcohol-aromatics mixture (sold under the registered trademark "Super-Beckamin 13-501" by Reichold-Albert-Chemie), 2 parts of xylene and 2 parts of methyl cellosolve are mixed and 100 parts of this mixture are stirred to a homogeneous lacquer solution. The 95 g of the resulting clear lacquer and 5 g of pigment are ground in a ball mill for 72 hours. The coloured lacquer is then applied by the conventional spray method to a metal sheet and stoved for 30 minutes at 120° C. A yellow finish of good lightfastness is obtained.

EXAMPLE 8

(Acrylic-melamine stoving lacquer)

41.3 parts of a 60% solution of an acrylic resin in xylene (sold by Vianova under the registered trademark "Viacryl VC 373"), 16.3 parts of a 55% solution of a melamine-formaldehyde resin in butanol (sold by Bayer under the registered trademark "Maprenal TTX"), 32.8 parts of xylene, 4.6 parts of ethyl glycol acetate, 2 parts of cyclohexanone, 2 parts of butyl acetate and 1 part of silicone oil A (1% in xylene; sold by Bayer) are stirred to a homogeneous lacquer solution. Then 95 g of the resulting clear lacquer and 5 g of the pigment obtained in Example 1 are ground for 72 hours in a ball mill. The coloured lacquer is sprayed onto a metal sheet and stoved for 30 minutes at 120° C. A yellow finish of good lightfastness is obtained.

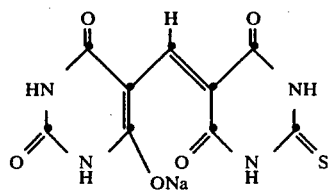

What is claimed is:
1. The pigment of the formula